United States Patent
Thursfield

(10) Patent No.: US 7,701,437 B2
(45) Date of Patent: Apr. 20, 2010

(54) INTERACTIVE DISPLAY AND METHOD OF DISPLAYING A MESSAGE

(75) Inventor: Paul Philip Thursfield, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1560 days.

(21) Appl. No.: 10/481,142

(22) PCT Filed: Jun. 21, 2002

(86) PCT No.: PCT/IB02/02467
§ 371 (c)(1),
(2), (4) Date: Dec. 17, 2003

(87) PCT Pub. No.: WO03/005177
PCT Pub. Date: Jan. 16, 2003

(65) Prior Publication Data
US 2004/0163105 A1   Aug. 19, 2004

(30) Foreign Application Priority Data
Jul. 3, 2001    (EP)  ................................ 01202548

(51) Int. Cl.
*G09G 5/00*    (2006.01)
(52) U.S. Cl. .................. 345/156; 382/115; 382/116; 382/117; 382/118; 382/124; 704/200
(58) Field of Classification Search .............. 345/173, 345/156; 725/19; 382/115–118, 124
See application file for complete search history.

(56) References Cited

U.S. PATENT DOCUMENTS

| | | | | |
|---|---|---|---|---|
| 5,737,740 A | * | 4/1998 | Henderson et al. | 715/530 |
| 6,075,844 A | * | 6/2000 | Goldberg et al. | 379/88.17 |
| 6,111,517 A | * | 8/2000 | Atick et al. | 340/5.83 |
| 6,311,077 B1 | * | 10/2001 | Bien | 455/566 |
| 6,320,588 B1 | * | 11/2001 | Palmer et al. | 345/473 |
| 6,603,464 B1 | * | 8/2003 | Rabin | 345/179 |
| 6,628,757 B1 | * | 9/2003 | Cannon et al. | 379/67.1 |
| 6,993,535 B2 | * | 1/2006 | Bolle et al. | 707/104.1 |
| 7,030,837 B1 | * | 4/2006 | Vong et al. | 345/1.3 |
| 2004/0024814 A1 | * | 2/2004 | Takeo et al. | 709/203 |

FOREIGN PATENT DOCUMENTS

JP   2000242254 A  *  9/2000
WO   WO0058850       10/2000

* cited by examiner

Primary Examiner—Sumati Lefkowitz
Assistant Examiner—Ke Xiao

(57) ABSTRACT

An interactive display (100) comprising a camera (400) that record a message presented to the interactive display. This message comprises the name of the person for whom the message is intended. When this person is identified via the camera (400) by face recognition or via a voice recorder (102) by voice recognition, the interactive display (100) displays the message to this person. When the interactive display (100) is not used, i.e. it is not used to record a message and there are no persons within sight of the camera (400) that can trigger a message being displayed, the interactive camera can be used as a mirror.

10 Claims, 2 Drawing Sheets

INTERACTIVE DISPLAY AND METHOD OF DISPLAYING A MESSAGE

The invention relates to an interactive display comprising:
recording means conceived to record a message presented to the interactive display;
playback means conceived to playback the message via the interactive display.

Furthermore, the invention relates to a method of displaying a message, the method comprising the following steps of:
recording the message presented to an interactive display;
playing back the message via the interactive display.

An embodiment of the interactive display as set forth above is known from WO 00/58850. Here, a photo kiosk is disclosed that comprises a camera that takes a picture of a user. The picture is converted into an electronic image. This image is displayed onto a monitor to the user who is required to explicitly select the image or to delete the image and let the camera take an other picture. The selected image is stored and the photo kiosk informs the user that a banner message, a text message, and/or an audio message can be added to the stored image. When, for example, a user adds a predefined banner message, the user makes a selection from the banners displayed on the monitor by inputting the selection through a keyboard and/or touch screen monitor of the kiosk. The banner is superimposed upon the image by the kiosk and the resulting image is displayed on the monitor. After completing the composition of the message, the user can choose to send the image to an email address or the user can save the image onto a removable disk. When the user chooses to send the image to an email address, the user is explicitly asked to fill in this address. Thus for each action the user needs to perform an explicit action which is indicated by the kiosk.

It is an object of the invention to provide an interactive display that enables a user to interact more naturally with the interactive display. In order to achieve this object, the interactive display according to the preamble is characterized in that the interactive display further comprises:
identification means conceived to identify a characteristic of a person;
verification means conceived to verify that the characteristic of the person maps onto an intended receiver of the message and, if so, trigger the playback means to playback the message via the interactive display.

By triggering the playback of the message for the person that exposes those characteristics that identify the intended receiver of the message, this person automatically receives those messages that are intended for him or her without the need for the person to perform an explicit action onto the interactive device. Furthermore, by recognizing the intended receiver of the message from, for example, the message itself, the intended receiver can be easily identified. For example, when the message starts with the name of the intended receiver, this name is extracted from the message and is used to identify the intended receiver.

An embodiment of the interactive display according to the invention is described in claim 2. By writing the message on the interactive display, entering the message can be done just like writing a paper memo intended for an other person or as a reminder to yourself.

An embodiment of the interactive display according to the invention is described in claim 3. By using voice to record the message, the message can be recorded in a natural way and from a certain distance of the interactive display without needing to touch the display. This can be useful for example, when the person who is recording the message has his or her hands full.

An embodiment of the interactive display according to the invention is described in claim 4. By identifying the person with face recognition, the playback of the message is triggered when the person walks or stands in front of the interactive display.

An embodiment of the interactive display according to the invention is described in claim 5. By identifying the person with voice recognition, the playback of the message is triggered when the person speaks to the interactive display upon which the interactive display can show all messages intended for the identified person.

An embodiment of the interactive display according to the invention is described in claim 6. By supplying the interactive display with a reflective surface, the interactive display can be used as a mirror when it does not show messages.

An embodiment of the interactive display according to the invention is described in claim 7. By supplying the interactive display with an interface, another apparatus can be connected to the interactive display in order to compose a message. A digital video camera is an example of such an apparatus, and a part of a video can be added to the message.

An other embodiment of an interactive display according to the preamble is generally known from an interactive display that comprises a recorder to record a person who stands in front of the display. The recorded person is played back at a later point in time. As an example this can be used while a person is fitting clothes. In order to view the back of the person, the person can turn his back to the display and the display will record his back. Then when the person turns to the display again, he can view his recorded back. Thus the interactive display behaves like a time-delayed mirror. However, the user is not able to interact further with this time-delayed mirror.

It is an object of the current invention to provide a method according to the preamble that enables a user to interact more naturally with an interactive display. In order to achieve this object, the method is characterized in that the method further comprises the following steps of:
identifying a characteristic of a person;
verifying that the characteristic of the person maps onto an intended receiver of the message and, if so, trigger the step of playing back the message via the interactive display.

Embodiments of the invention are described in claims 9 to 10.

The invention will be described by means of embodiments illustrated by the following drawings.

Figure 1:
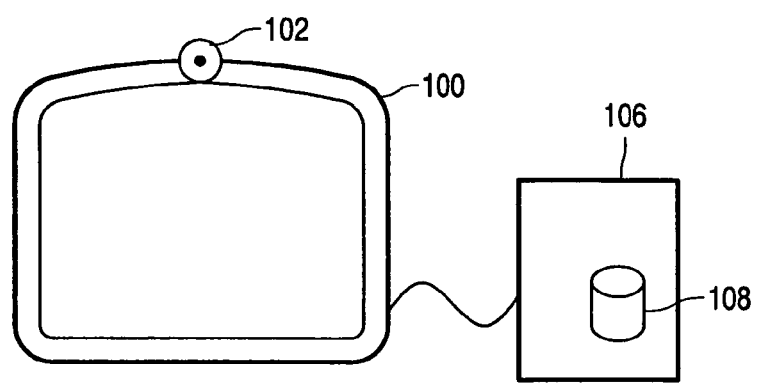
FIG. 1 illustrates the interactive display according to the invention to record a message.

FIG. 1 illustrates the interactive display 100 according to the invention to record a message. The interactive display 100 comprises a voice recorder 102 and a computing device 106. The computing device 106 provides the processing for the different algorithms used within the invention and it comprises a database 108 to store and retrieve the recorded messages. The database can also be used for other purposes, for example to store favorite recipes of the persons etc. Consider the situation when person A wants to leave a message to person B, for example to go to the grocery store to buy some potatoes. Then person A can stand in front of the interactive display 100 and say: "B, buy some potatoes". The voice recorder 102 will record this spoken message. This message is then transported to the computing device 106. The computing device contains a translation algorithm that translates the spoken text into computer readable text, for example ASCII. Then a parser parses the computer readable text and derives words from the text. Each word is then compared to the contents of the database 108. This database comprises the following parameters per person: the name, the parameters needed to recognize his or her face, the parameters to recognize his or her voice, the status, and the recorded messages intended for the person, see table 1. However, a sub-selection or an extension of these parameters can be used too in order to provide the concept of the invention.

TABLE 1

| Name | Face | Voice | Status | Messages |
|------|------|-------|--------|----------|
| A | ☺ | ♪ | 1 | <None> |
| B | ☺ | ♪ ♪ | 2 | "B, buy some potatoes"; "B, cinema at 8 pm, love C" |
| C | ☻ | ♪ ♪ ♪ | 1 | "C, dinner at six" |
| General-purpose | N.A. | N.A. | N.A. | PICTURE1.jpg |

When a word within the message equals a name within the column "Name", the recorded message is stored for the intended receiver within the column "Messages". Other ways to add the recorded message for the intended receiver can be used too as can easily be derived by the person skilled in the art. Within the current example, the name "B" is derived from the message and the message "B, buy some potatoes" is added to the list of messages for B. This list already contained an other message: "B, cinema at 8 pm, love C". The list can be sorted in different ways: latest recorded on top or at the bottom or sorted depending upon content. In the latter case, the parser can be able to recognize all kinds of formats of time. The column labeled "Status" indicates which messages an intended receiver is allowed to see. Status 1 means that the person is allowed to see only his or her messages, whereas Status 2 means that the person is allowed to view all messages. This "Status" can be used for all kinds of purposes in order to control the access rights to the contents of the database 108.

Figure 2:
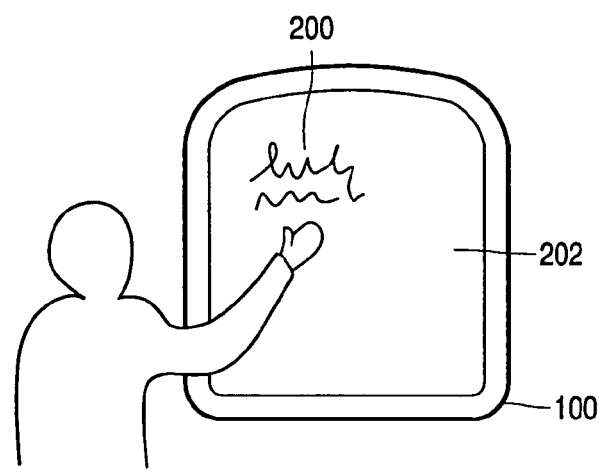
FIG. 2 illustrates the interactive display according to the invention for a handwritten message.

FIG. 2 illustrates the interactive display according to the invention for a handwritten message. Then person A writes down the message 200 onto the surface of the interactive display 100. In this case, the interactive display 100 comprises a touch screen 202 onto which the message is written. Then, an algorithm for hand reading reads the message from the screen and translates it into computer readable text, for example UNICODE. From this computer readable text, the parser can derive the name of the intended receiver and add the message for the intended receiver as previously described.

Figure 3:
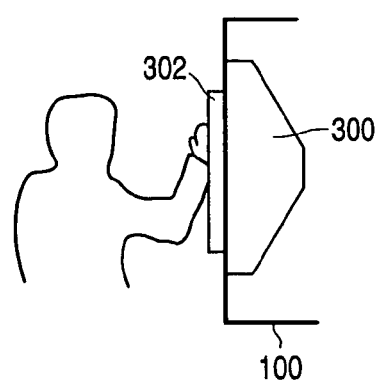
FIG. 3 illustrates the interactive display according to the invention to imprint a picture within a message.

FIG. 3 illustrates the interactive display according to the invention to imprint a picture within a message. Within this embodiment the interactive display 100 comprises a scanner 300 that can scan a picture 302 that is pressed against its surface. This picture 302 can be displayed on the interactive display 100 as, so called, wallpaper at basically the same position as where it was held against the surface. Then the picture 302 will be added to the database within the row containing the name "general-purpose" to indicate a general-purpose container of non-directed messages. When a user wants to record the picture 302 within a message, the user can simply place the picture at the position onto which the picture is to be shown when the message is displayed for the intended receiver. The scanner 300 records the position of the picture and the algorithm for hand reading will add this position to the computer readable text with a link indicating which picture is to be displayed onto that position.

Figure 4:
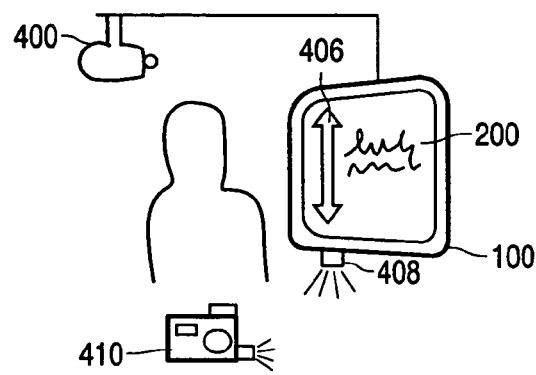
FIG. 4 illustrates the interactive display according to the invention to display a recorded message.

FIG. 4 illustrates the interactive display 100 according to the invention to display a recorded message. Consider the recorded message 200 that was recorded for the intended receiver, person B via handwriting. The interactive display 100 further comprises a camera 400. When person B stands in front of the camera 400, the camera 400 records the person's face and a face recognition algorithm searches the database for a matching pattern. Person B will have facial recognizable characteristics matching ☺. Then the algorithm will retrieve the messages "B, buy some potatoes"; "B, cinema at 8 pm, love C" for person B from the database and show these messages on the interactive display. After some time, after B has moved out of the sight of the camera 400, the messages will disappear from the interactive display 100. This time is configurable. When the number of messages exceeds the height of the interactive display 100, a scrollbar 406 or any other user interface gadget well known to the person skilled in the art will appear on the display to enable B to view all the messages intended for him. Thus person B does not need to perform an explicit action with the interactive display in order to trigger the message being displayed.

Consider the recorded message that was recorded for the intended receiver, person B through the spoken message. When person B speaks into the voice recorder 102, the voice recognition algorithm searches the database for a matching voice pattern. Person B will have voice recognizable characteristics matching ♪♪. Then the voice recognition algorithm will retrieve the messages "B, buy some potatoes" 402; "B, cinema at 8 pm, love C" 404 for person B from the database and show these messages 402, 404 on the interactive display as previously described.

When person B does not want to view a message again, he can just wipe it out by touching the whole message with his hand with a strike through gesture. Other user interface interactions are also possible, like for example a control panel which can be invoked via voice control and that provides basic editorial (erase, copy, modify) facilities.

Furthermore, the interactive display 100 comprises an interface 408 that is for example compliant with the blue tooth protocol. Then the user that composes the message can use a digital camera 410 that is also blue tooth compliant to retrieve pictures from and add these pictures to the message that is being composed.

Figure 5:
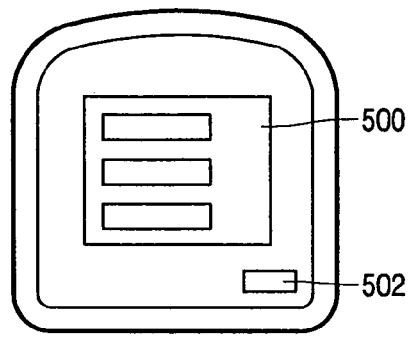
FIG. 5 illustrates a management control screen through which persons can be added to the database in order to interact with the interactive display according to the invention.

FIG. 5 illustrates a management control screen 500 through which persons can be added to the database 108 in order to interact with the interactive display. The layout of this management control screen is to be interpreted as an example providing the main controls. The control screen 500 can be invoked upon the interactive display 100 by voice control or by pressing a predefined area 502 of the interactive display 100. Depending upon the status of a person, a person is allowed to add or erase persons from the database or to change the "general-purpose" entry. Furthermore, the person is able to view all messages recorded depending upon the status of the person.

Figure 6:
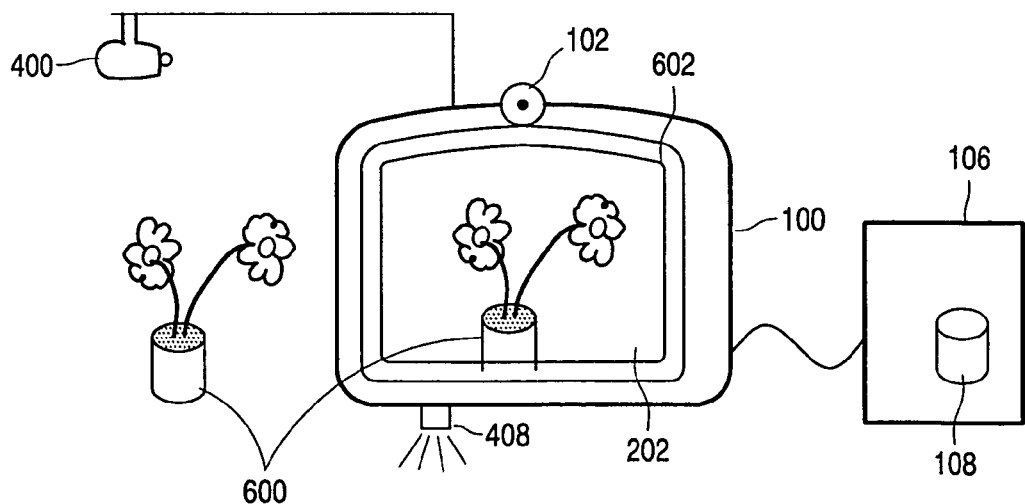
FIG. 6 shows the interactive display according to the invention with the main devices connected to it: the voice recorder, the camera, the computing device, the database, the touch screen and the interface.

FIG. 6 shows the interactive display 100 with the main devices connected to it: the voice recorder 102, the camera 400, the computing device 106, the database 108, the touch screen 202 and the interface 408. Furthermore, the interactive display 100 is provided with a reflective layer 602 that reflects the objects placed in front of the interactive display 100. Thus the interactive display 100 acts like a mirror and reflects flowers 600 that are placed in front of it.

The invention claimed is:

1. An interactive display comprising:
    recording means conceived to record a message, wherein said message is parsed to determine at least one identification characteristic of an intended receiver of said message;
    playback means conceived to playback the message via the interactive display;
    identification means conceived to identify at least one characteristic of a person; and
    verification means conceived to verify whether at least one characteristic of the person maps onto the at least one identification characteristic of the intended receiver and, if so, triggering the playback means to playback the message, including previously stored messages associated with the identified receiver, via the interactive display.

2. An interactive display according to claim 1, wherein the recording means is conceived to record the message when it is presented by handwriting the message.

3. An interactive display according to claim 1, wherein the recording means is conceived to record the message when it is presented by speaking the message.

4. An interactive display according to claim 1, wherein the identification means is conceived to identify the at least one characteristic of the person by face recognition.

5. An interactive display according to claim 1, wherein the identification means is conceived to identify the at least one characteristic of the person by voice recognition.

6. An interactive display according to claim 1, further comprising:
    reflecting means conceived to reflect substantially the opposite surroundings of the interactive display.

7. An interactive display according to claim 1, further comprising:
    interface means conceived to interface with an interface means compliant apparatus.

8. A method of displaying a message, the method comprising:
    recording the message presented, wherein said message is parsed to determine at least one identification characteristic of an intended receiver of said message;
    identifying at least one characteristic of an identified person;
    playing back the message, and previously stored messages associated with the identified person, via the interactive display when at least one characteristic of an identified person maps onto the at least one identification characteristic of the intended receiver.

9. The method of displaying a message according to claim 8, wherein the message is presented to the interactive display by writing the message.

10. The method of displaying the message according to claim 8, wherein the message is presented to the interactive display by speaking the message.

* * * * *